United States Patent [19]

Inoue et al.

[11] Patent Number: 5,317,865
[45] Date of Patent: Jun. 7, 1994

[54] GAS GENERATING APPARATUS

[75] Inventors: Kazuo Inoue, Tokyo; Osamu Kubota, Saitama; Tsuneo Endoh, Tokyo, all of Japan

[73] Assignee: Honda Giken Kogyo Kabushiki Kaisha, Tokyo, Japan

[21] Appl. No.: 994,599

[22] Filed: Dec. 21, 1992

Related U.S. Application Data

[63] Continuation of Ser. No. 631,661, Dec. 20, 1990, abandoned.

[51] Int. Cl.⁵ ............................................. F02C 3/06
[52] U.S. Cl. ..................................... 60/39.36; 60/722
[58] Field of Search ............... 60/722, 39.36, 39.6, 60/39.75

[56] References Cited

U.S. PATENT DOCUMENTS

| | | | |
|---|---|---|---|
| 2,567,079 | 9/1951 | Owner et al. | 60/39.37 |
| 2,651,913 | 9/1953 | Hodgson | 60/39.75 |
| 2,663,141 | 12/1953 | Hage | 60/39.16 |
| 3,010,281 | 11/1961 | Cervenka et al. | 60/39.37 |
| 3,088,278 | 5/1963 | Franz | 60/39.36 |
| 3,626,694 | 12/1971 | Holste | 60/722 |
| 3,738,105 | 6/1973 | Buchelt | 60/39.31 |
| 3,782,108 | 1/1974 | Holste | 60/39.75 |
| 3,782,111 | 1/1974 | Kotoc | 60/39.69 |
| 3,808,796 | 5/1974 | Spears, Jr. | 60/39.09 |
| 3,837,760 | 9/1974 | Stalker | 415/181 |
| 3,965,699 | 6/1976 | Bracken, Jr. | 60/39.36 |
| 4,086,760 | 5/1978 | Chute | 60/39.36 |
| 4,300,349 | 11/1981 | Heckel | 60/722 |
| 4,620,414 | 11/1986 | Christ | 60/39.75 |
| 4,955,201 | 9/1990 | Shekleton et al. | 60/39.36 |
| 5,001,895 | 3/1991 | Shekleton et al. | 60/39.36 |
| 5,097,660 | 3/1992 | Shekleton | 60/39.75 |

FOREIGN PATENT DOCUMENTS

| | | |
|---|---|---|
| 0674852 | 1/1966 | Belgium . |
| 872698 | 4/1953 | Fed. Rep. of Germany . |
| 1007743 | 5/1952 | France . |
| 0684401 | 12/1952 | United Kingdom . |

Primary Examiner—Richard A. Bertsch
Assistant Examiner—Howard R. Richman
Attorney, Agent, or Firm—Lyon & Lyon

[57] ABSTRACT

An improved gas generator apparatus having a compressor, a combustor, and a turbine having a turbine rotor coupled by a rotor shaft to the compressor rotor of the compressor. The combustor is spiral shaped and positioned between the compressor and turbine which allows the direction of flow of air or working gas to remain substantially unchanged from the compressor to the turbine, while maintaining a compact configuration. In operation, air drawn into the compressor is swirled circumferentially and pressurized by the compressor, and then delivered into a combustion chamber while it is being swirled. Air is expanded in the combustion chamber as it is swirled in and along the spirally shaped expansion chamber tube and then flows as a working gas into the turbine in which the gas drives the turbine rotor while the gas is still being swirled in the same direction. The air or working gas, therefore, maintains a swirling flow in one direction from the compressor to the turbine. In one embodiment, the scrolls for the compressor and turbine a compactly located in a normally empty space surrounding the shroud for the rotors of the compressor and turbine. In another embodiment, the separate compressor shroud is eliminated by providing a casing surrounding the spiral combustion expansion tube for receiving compressed air directly into that casing.

15 Claims, 6 Drawing Sheets

GAS GENERATING APPARATUS

This is a continuation of co-pending application U.S. patent application Ser. No. 07/631,661 filed on Dec. 20, 1990, now abandoned.

BACKGROUND OF THE INVENTION

The present invention relates to a gas generating apparatus applicable to a gas turbine, and more particularly to an improved gas generating apparatus comprising a compressor, a combustor, and a turbine having a turbine rotor coupled to the compressor rotor of the compressor.

Such a gas generating apparatus is disclosed in U.S. Pat. No. 3,837,760, wherein the gas generating apparatus includes an axial type compressor and a spiral type combustor. The spiral type combustor has a large combustion ability and is compact since a long expansion chamber tube can be housed in a small space. However, with the axial type compressor and the spiral combustor combined, when air compressed by the compressor flows into the combustor, the direction of air flow is abruptly changed which results in a large pressure loss.

One object of the present invention is to provide a gas generating apparatus which allows the direction of flow of air or a working gas to remain substantially unchanged from the compressor to the turbine, while maintaining a compact configuration.

SUMMARY OF THE PRESENT INVENTION

The present invention is directed to an improved gas generator apparatus having a compressor, a combustor, and a turbine having a turbine rotor coupled to the compressor rotor which allows the direction of flow of air or working gas to remain substantially unchanged from the compressor to the turbine, while maintaining a compact configuration.

A gas generating apparatus according to a first feature of the present invention comprises a radial type compressor, a turbine having the turbine rotor coupled to the compressor rotor through a rotor shaft, and a combustor having a spiral type expansion chamber tube surrounding the rotor shaft and communicating between the compressor and the turbine. In operation, air drawn into the compressor is swirled and pressurized, and then delivered into a combustion chamber while it is being swirled. In the combustion chamber, the air is sufficiently expanded as it is swirled in and along the spirally shaped expansion chamber tube which is relatively long in the direction of gas flow, and flows as a working gas into the turbine in which the gas drives the turbine rotor while the gas is still being swirled. The air or working gas, therefore, maintains a swirling flow continuously in one spiral direction from the compressor to the turbine.

According to a second feature of the present invention, in addition to the first feature, in one embodiment a scroll for the compressor is disposed in surrounding relation to a smaller-diameter portion of a shroud which covers the blades of the compressor rotor. Therefore, a normally empty space around the shroud of the compressor is utilized for installing the compressor scroll therein, resulting in a compact compressor size.

According to a third feature of the present invention, in addition to the first feature, in one embodiment a scroll for the turbine is disposed in surrounding relation to a smaller-diameter portion of a shroud which covers the blades of the turbine rotor. Therefore, a normally empty space around the shroud of the turbine is utilized for the installation of the turbine scroll, resulting in a compact turbine size.

According to a fourth feature of the present invention, in addition to the second feature, the scroll of the compressor and the expansion chamber tube of the combustor are disposed in a sandwiching relation to a diffuser of the compressor therebetween, with the scroll of the compressor, the expansion chamber and the diffuser being of substantially the same diameter, and the gas generating apparatus further including a communication tube communicating between the compressor scroll and the expansion chamber tube and extending over and across the diffuser, the communication tube having a circumferentially-extending thin and flat shape in the radial direction of the diffuser. Therefore, the gas generating apparatus is very compact because the compressor and the combustor are of the same diameter, and the projection of the communication tube in the radially outward direction is minimized because the communication tube is flat in shape.

According to a fifth feature of the present invention, in addition to the fourth feature, in one embodiment the gas generating apparatus further includes a transmission case housing a transmission mechanism operatively coupling the rotor shaft and accessories, the transmission case being disposed in covering relation to a front surface of the communication tube. In operation, a dead space around an air intake tube of the compressor is utilized for installing therein the transmission case which supports the accessories thereon, so that the compressor is rendered compact. The transmission case conceals the communication tube on its front side, thus covering the increase by the communication tube of the frontal area of the projected shape of the gas generating apparatus.

According to a sixth feature of the present invention, in another embodiment of the gas generating apparatus the combustor portion has a spiral type expansion chamber tube surrounded by a casing directly communicating with the compressor diffuser for supplying compressed air directly to the combustor without a separate compressor scroll.

Other features and advantages of this invention will be apparent to those skilled in the art from the following description of the preferred embodiments.

DETAILED DESCRIPTION OF A PREFERRED EMBODIMENT

Two preferred embodiments of the present invention will now be described with reference to the drawings.

Figure 1:
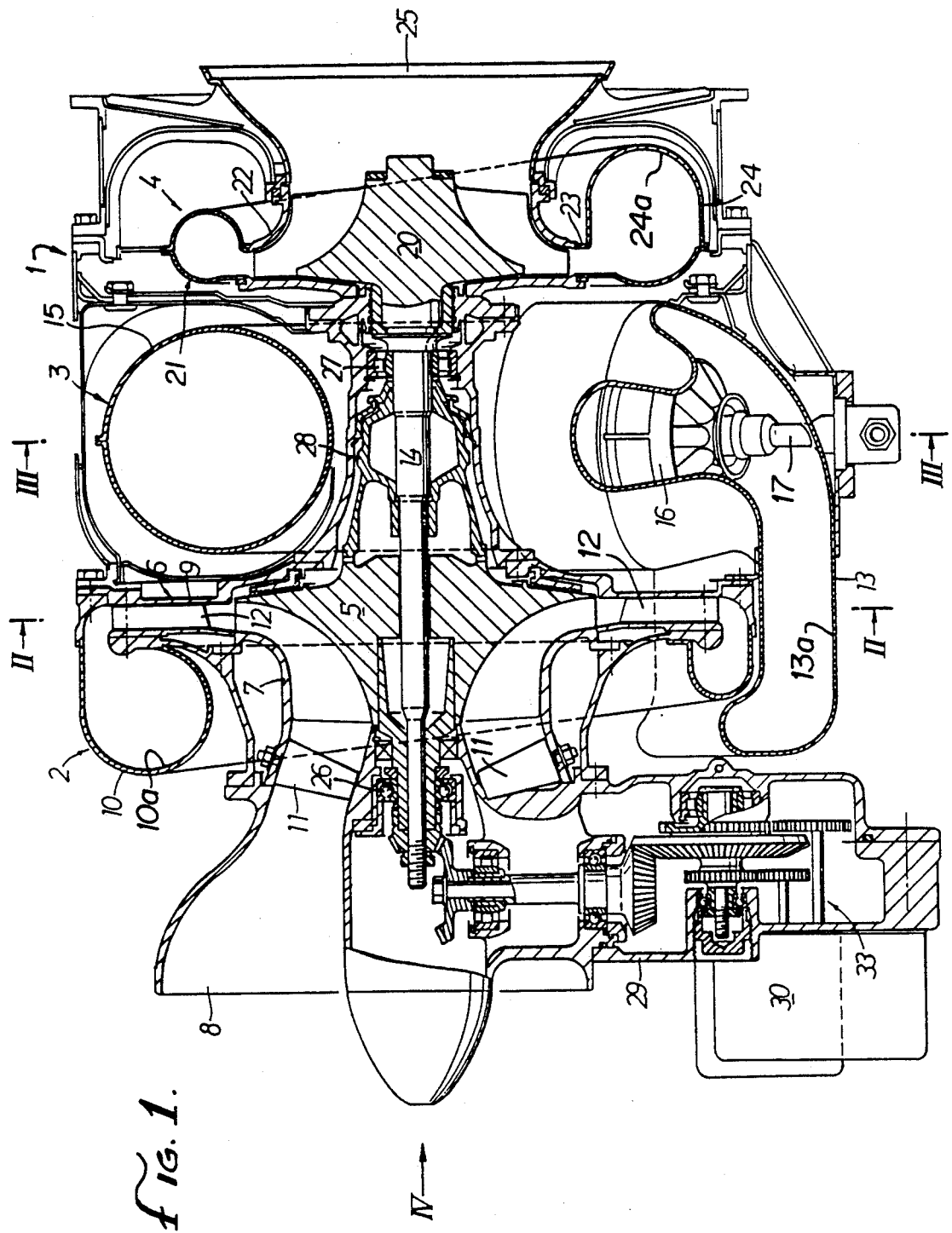
FIG. 1 is a vertical cross-sectional view of a gas generating apparatus for use in a gas turbine.

FIG. 1 shows a gas generating apparatus, generally designated 1, for use in a gas turbine. The gas generating apparatus 1 essentially comprises a compressor 2, a combustor 3, and a turbine 4 arranged coaxially along a rotor shaft 14.

Figure 2:
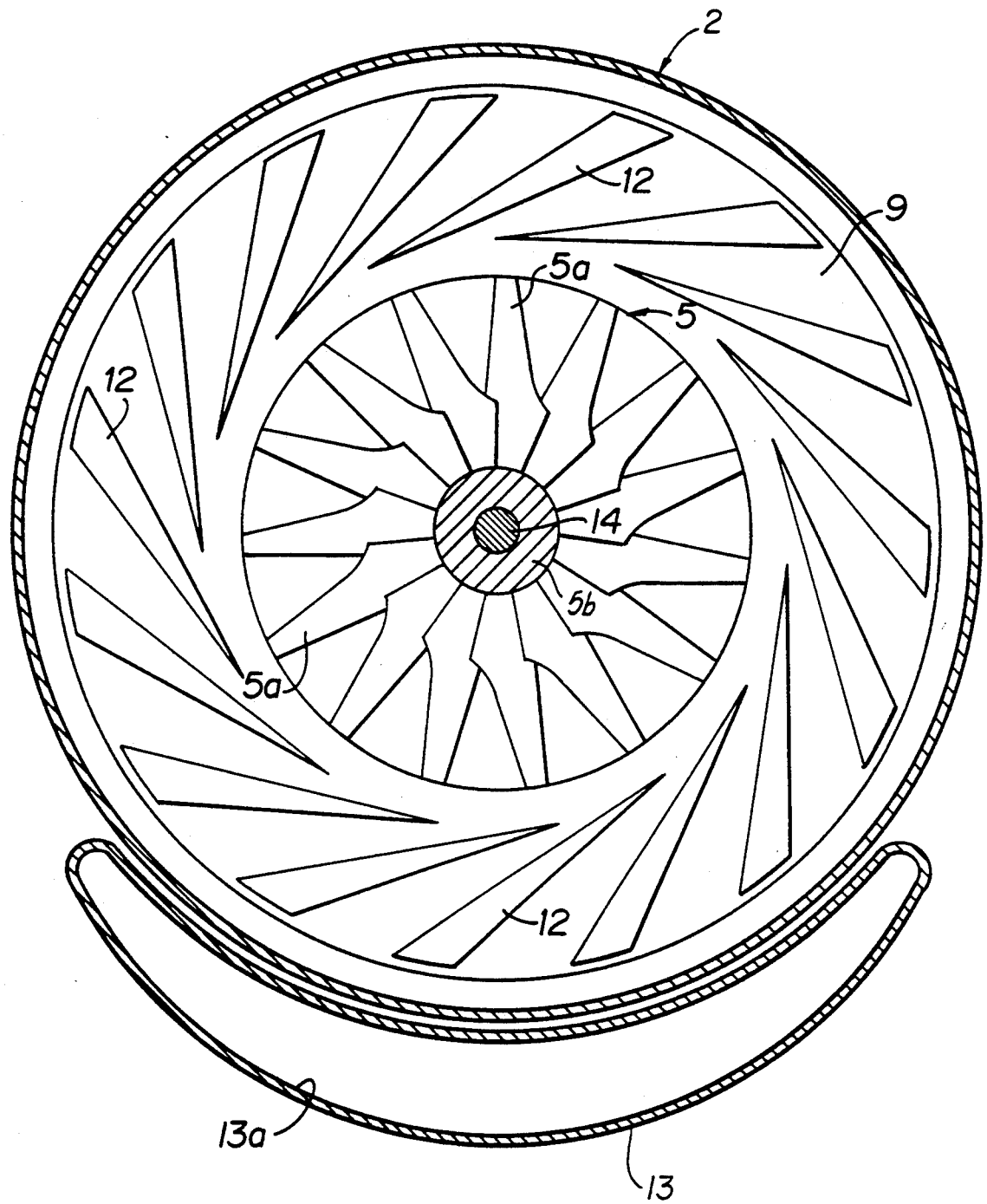
FIG. 2 is a cross-sectional view taken along the line II—II in FIG. 1.

As shown in FIGS. 1 and 2, the compressor 2 is of a radial type comprising a compressor rotor 5, and a compressor casing 6 housing the compressor rotor 5. The compressor rotor 5 includes a plurality of blades 5a mounted to a rotor hub 5b which is connected to and rotates with rotor shaft 14. Both the rotor blades 5a and the rotor hub 5b become progressively larger in diameter from an inlet end to an outlet end. The compressor casing 6 comprises (a) a shroud 7 accommodating the blades 5a (shown in FIG. 2) of the compressor rotor 5, (b) an air inlet tube 8 extending axially from a front end of the shroud 7 and housing the inlet end of the compressor rotor 5 therein, (c) a diffuser 9 extending radially outwardly from a larger-diameter portion of shroud 7 and housing the outlet end of the compressor rotor 5, and (d) a scroll 10 displaced forwardly (to the left as viewed in FIG. 1) from the outer peripheral portion of the diffuser 9 and surrounding a smaller diameter portion of the shroud 7. An annular group of inlet vanes 11 are disposed in the air inlet tube 8 in confronting relation to the inlet end of the compressor rotor 5. An annular group of diffuser vanes 12 are disposed in the diffuser 9 in confronting relation to the outlet end of the compressor rotor 5.

The scroll 10 has a passage 10a defined therein with the cross-sectional area of the passage 10a progressively increasing in the direction in which the compressor rotor 5 rotates about its own axis. The combustor 3 is connected via a communication tube 13 to the end of the scroll 10 which has the maximum cross-sectional area of the passage 10a.

The combustor 3 has a spiral expansion chamber tube 15 which surrounds a rotor shaft 14 interconnecting the compressor rotor 5 and a turbine rotor 20 (to be described later) and a combustion tube 16 disposed in an inlet end of the expansion chamber tube 15. A fuel injection valve 17 is disposed in the center of the combustion tube 16. The expansion chamber tube 15 is spirally coiled in the direction of rotation of the rotor shaft 14 while being axially displaced rearwardly (to the right as viewed in FIG. 1) from the communication tube 13 toward the turbine 4.

Figure 3:
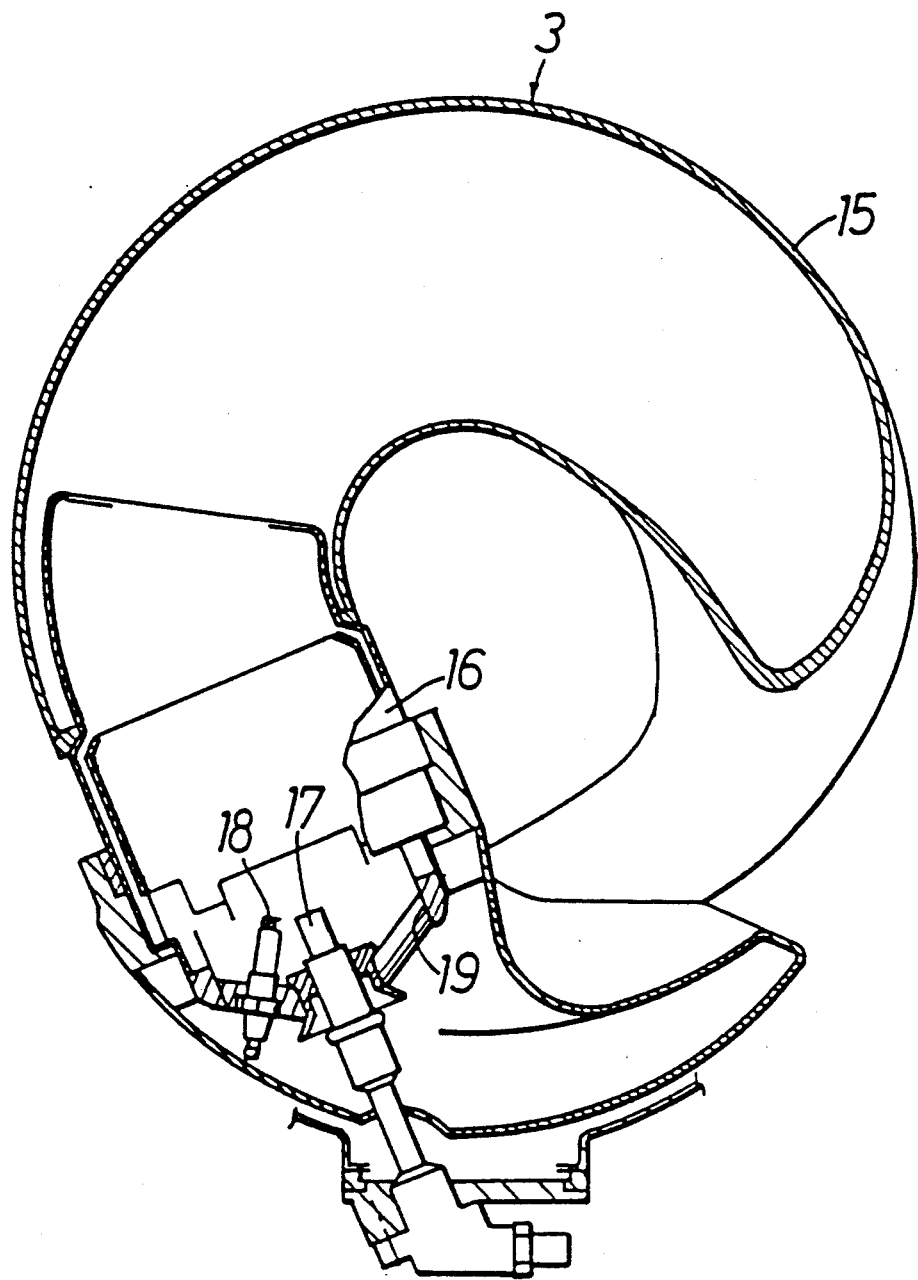
FIG. 3 is a cross-sectional view taken along the line III—III in FIG. 1.

As shown in FIG. 3, the combustion tube 16 has an open end directed downstream with respect to the expansion chamber tube 15. A fuel injection valve 17 and an ignition plug 18 are mounted on the head of the combustion tube 16 which is opposite to the open end thereof. The head of the combustion tube 16 has a number of through holes 19 for introducing air from the communication tube 13 into the combustion tube 16. During operation of the gas generating apparatus 1, fuel injected from the fuel injection valve 17 and air introduced into the combustion tube 16 are mixed into an air-fuel mixture, which is then ignited by the ignition plug 18 to produce a combustion gas that is discharged from the combustion tube 16 downstream into the expansion chamber tube 15.

The diffuser 9, the scroll 10, and the expansion chamber tube 15 are of substantially the same outside diameter to provide a compact construction. The communication tube 13, which provides communication between the scroll 10 and the expansion chamber tube 15, extends obliquely over and across the diffuser 9 along the direction in which the expansion chamber tube 15 is spirally coiled. As illustrated in FIG. 2, the communication tube 13 has a crescent-shaped cross section which is relatively flat or thin in the radial direction of the diffuser 9 to minimize the outwardly extending dimension of the gas generating apparatus.

As illustrated in FIG. 1, the turbine 4 is of a radial type comprising a turbine rotor 20 with a turbine casing 21 housing the turbine rotor 20. The turbine rotor 20 becomes progressively smaller in diameter from an inlet end to an outlet end thereof. The turbine casing 21 comprises a shroud 22 accommodating the blades of the turbine rotor 20, a nozzle 23 joined to a larger-diameter portion of the turbine shroud 2 at the inlet end of the turbine rotor 20, a scroll 24 displaced rearwardly from the nozzle 23 and surrounding a smaller-diameter portion of the turbine shroud 22, and an exhaust tube 25 extending axially from a rear end of the turbine shroud 22 and housing the outlet end of the turbine rotor 20. The scroll 24 has a passage 24a defined therein with its cross-sectional area progressively decreasing in the direction in which the turbine rotor 20 rotates about its own axis. The expansion chamber tube 15 has a downstream end connected to the end of the scroll 24 which has the largest cross-sectional area for the scroll 24 to supply the gases to the nozzle 23 in a relatively uniform manner around the entire circumference as the area of passage 24a decreases.

The rotor shaft 14 is rotatably supported in the compressor casing 6 and the turbine casing 21 by a pair of front and rear bearings 26, 27, respectively. The rear bearing 27 is disposed radially inward of the combustor 3 and the front bearing is disposed radially inward of the compressor 2. The rotor shaft 14 is securely joined to the turbine rotor 20 behind the bearing 27. A coupling 28 is fixedly mounted on the rotor shaft 14 between the bearings 26, 27, and the compressor rotor 5 is coupled to the coupling 28. The compressor rotor 5 and the turbine rotor 20 are thus integrally coupled to the rotor shaft 14.

Figure 4:
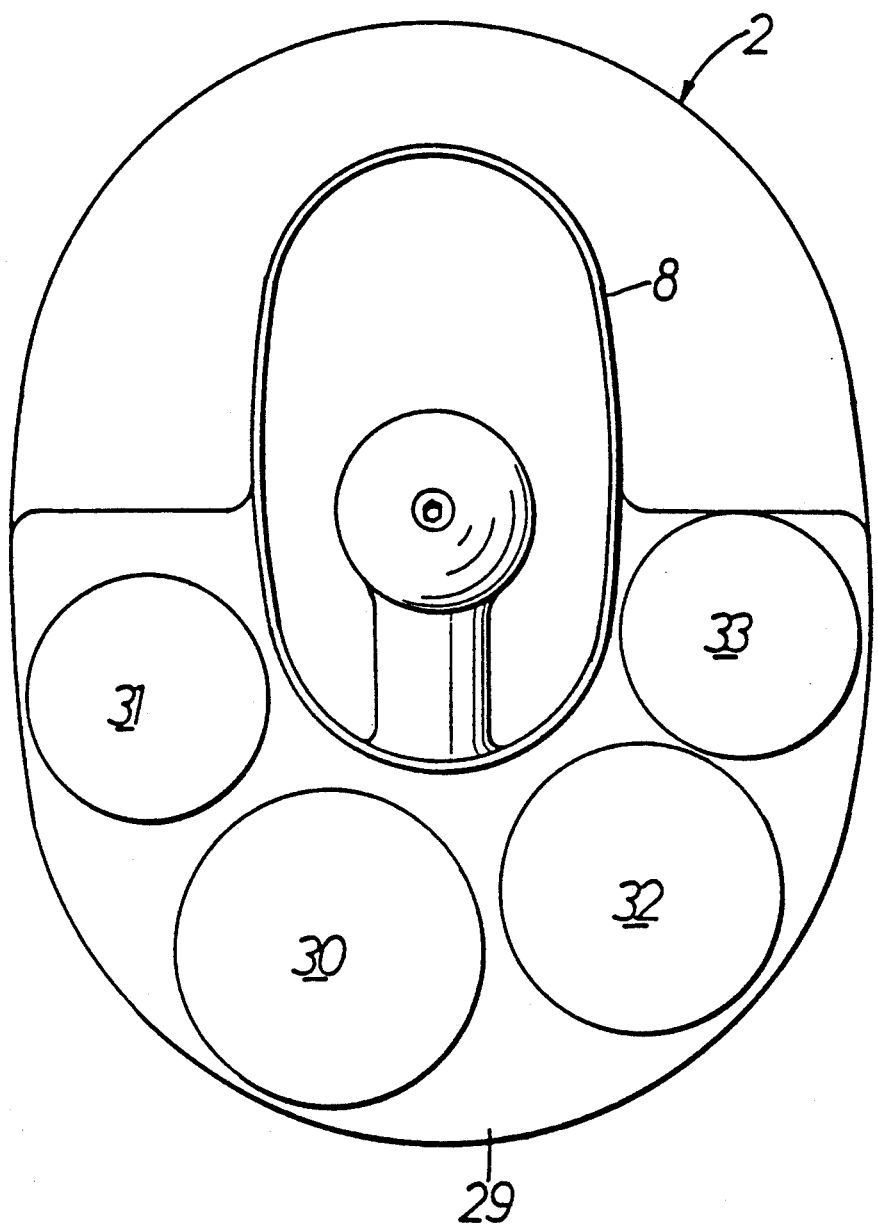
FIG. 4 is a front elevation view of the turbine of FIG. 1 as viewed in the direction of the arrow IV in FIG. 1.

A transmission case 29 is coupled to the air intake tube 8 and extends from the center of the air intake tube 8 across the front surface of the scroll 10. The transmission case 29 has a portion projecting outwardly of the scroll 10 and disposed in a covering relation to the front surface of the communication tube 13. As shown in FIG. 4, various accessories such as a starter 30, a lubricating oil pump 31, and a generator 32 may be conveniently mounted in spaced relation on the front surface of the transmission case 29, and operatively coupled to the rotor shaft 14 through a gear transmission mechanism 33 housed in the transmission case 29.

The operation of this embodiment will now be described. Air drawn into the air intake tube 8 is pressurized by the compressor rotor 5 and then passed through the diffuser 9 into the scroll 10 through which the air is swirled in the clockwise direction, as viewed from the front and in FIG. 2. The air is then fed under pressure through the communication tube 13 into the expansion chamber tube 15 and continues to swirl in the clockwise direction. While the air is flowing through the expansion chamber tube 15, it is expanded into a high-pressure working gas by the combustion gas ejected from the combustion tube 16. The working gas flows into the scroll 24 of the turbine 4 where its flow speed increases and still continues to swirl in the clockwise direction, as viewed from the front, after which the working gas impinges upon the turbine rotor 20 through the nozzle 23. While driving the turbine rotor 20, the working gas flows out into the discharge tube 25 from which it goes into an output turbine (not shown).

The drive force applied to the turbine rotor 20 by the working gas is transmitted through the rotor shaft 14 to the compressor rotor 5 thereby driving the rotor 5.

Both the compressor 2 and the turbine 4 are of a radial type and the expansion chamber tube 15 communicating between the scrolls 10, 24 thereof is spirally shaped. Therefore, the air or working gas going through the compressor 2, the turbine 4, and the expansion chamber tube 15 flows as a spiral stream continuously in the same direction (i.e. clockwise) which is subjected to a Very small pressure loss, thus increasing efficiency.

Since the expansion chamber tube 15 is disposed in surrounding relation to the rotor shaft 14 between the rotors 5, 20, it has a sufficient length in the spiral direction of gas travel without making the overall apparatus 1 large in size, either radially or axially, and cooperates with the combustion tube 16 to provide excellent combustion capability.

The scroll 10 of the compressor 2 and the expansion chamber tube 15 are of substantially the same diameter and disposed in axially sandwiching relation to the diffuser 9. The scroll 24 of the turbine 4 is displaced toward the discharge tube 25. Such an arrangement enables the gas generating apparatus 1 to achieve a compact, substantially cylindrical configuration with reduced dead or empty space therein.

Regardless of the fact that the scroll 10 and the expansion chamber tube 15 are disposed one on each side of the diffuser 9, the communication tube 13 extending over and across the diffuser 9 is of a thin or flat crescent-shaped cross section. Consequently, the passage 13a defined in the communication tube 13 maintains a sufficient cross-sectional area, but its projection radially outwardly of the diffuser 9 is held to a minimum.

The transmission case 29 joined to the air intake tube 8 of the compressor 2 projects across the front surface of the scroll 10 and the accessories 30, 31, 32 are disposed in spaced relation on the front surface of the transmission case 29. Thus, dead space positioned laterally of the air intake tube 8 is effectively utilized for installing the transmission case 29 therein resulting in a more compact arrangement for the entire gas generator apparatus 1 and greater freedom for the location of the accessories.

The portion of the transmission case 29, which necessarily must project outwardly of the scroll 10 because of the size of the transmission case 29, is positioned in a covering relation to the front surface of the communication tube 13. The transmission case 29 thus arranged covers any increase by the communication tube 13 in the area of the forwardly projected shape and area of the gas generating apparatus 1.

Figure 5:
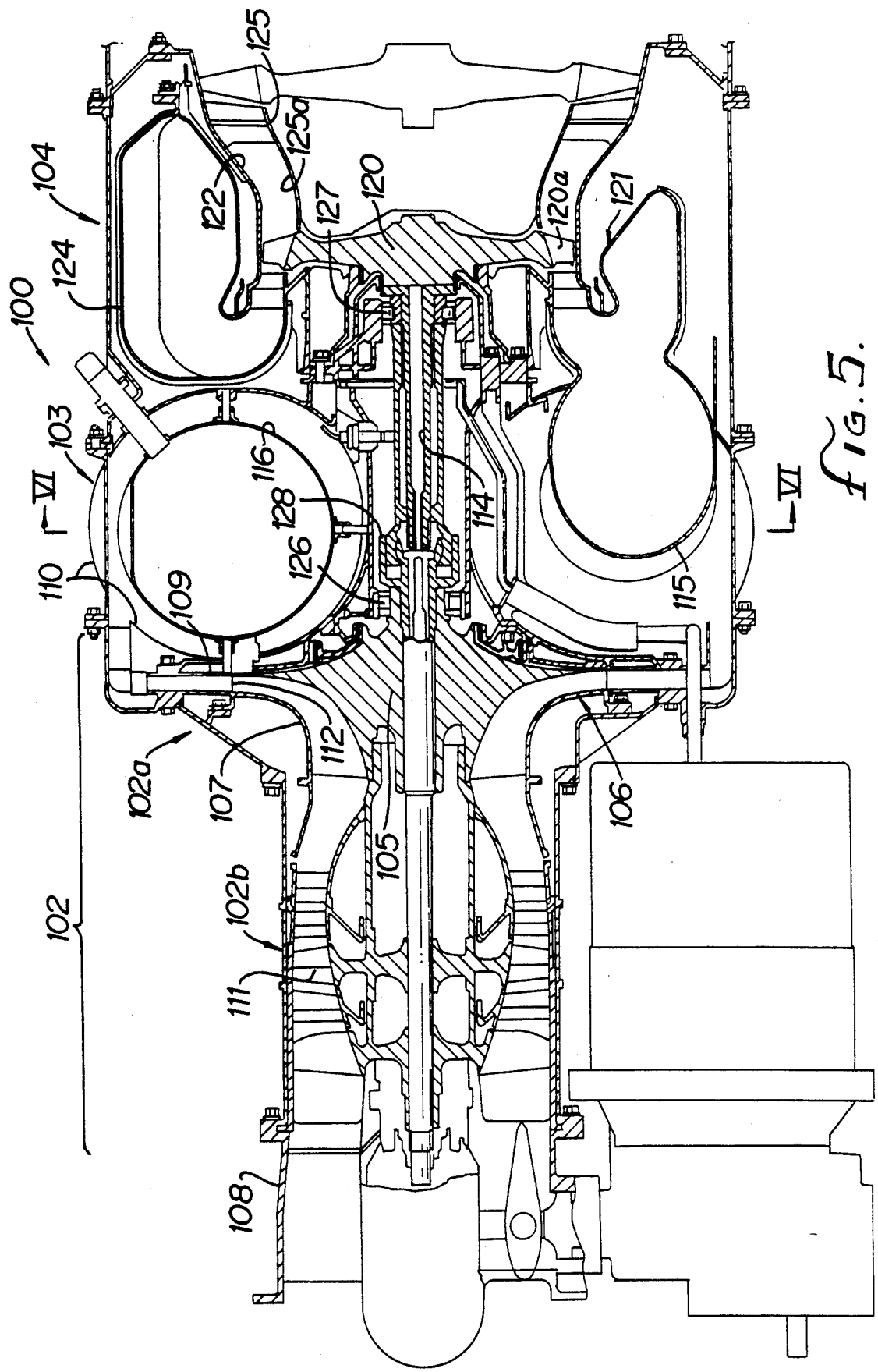
FIG. 5 is a cross-sectional view similar to FIG. 1 of an alternate embodiment of a gas generating apparatus having an axial compressor.
Figure 6:
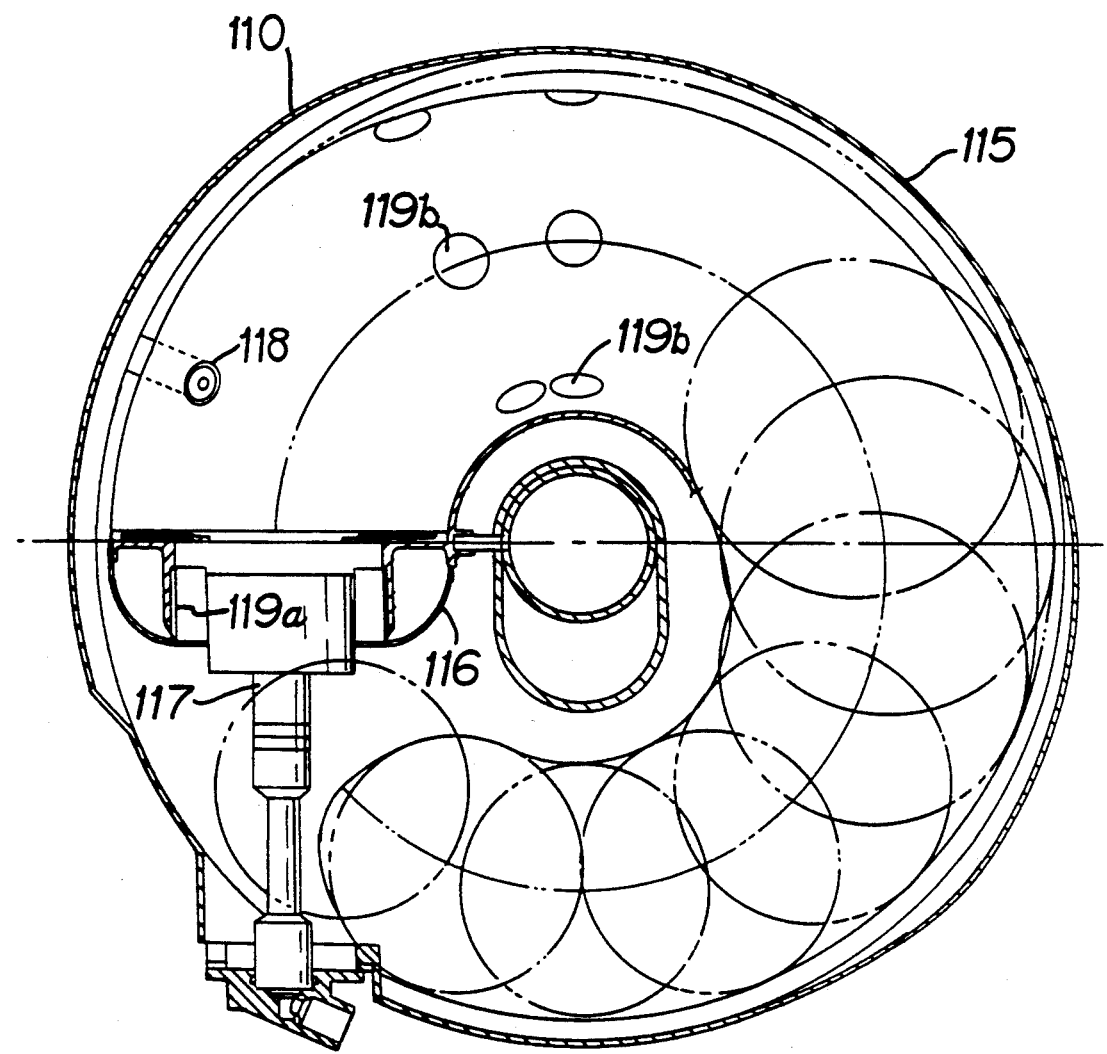
FIG. 6 is a cross-sectional view taken along the line VI—VI in FIG. 5.

FIGS. 5 and 6 illustrate an alternative embodiment for a gas generating apparatus 100 essentially comprised of a compressor 102, a combustor 103, and a turbine 104. Many of the elements of this embodiment 100 are the same or have substantially the same function as elements of the first embodiment 1 and will be identified by the same numeral in the "100" series with any differences being described.

The compressor 102 is a combination type compressor with a radial type compressor portion 102a connected in series to an axial type compressor portion 102b such that gas exiting the axial type compressor portion 102b enters the radial type compressor portion 102a. The radial type compressor portion includes a compressor rotor 105 which becomes progressively larger in diameter from an inlet end to an outlet end, and a compressor casing 106 housing the compressor rotor 105. The compressor casing 106 includes (a) a shroud 107 accommodating the blades of the compressor rotor 105, (b) an air inlet tube 108 extending axially from a front end of the shroud 107 and housing the axial compressor 102b and the inlet end of the compressor rotor 105 therein, and (c) a diffuser 109 extending radially outwardly from a larger-diameter portion of shroud 107 and housing the outlet end of the compressor rotor 105. An annular group of diffuser vanes 112 are disposed in the diffuser 109 in confronting relation to the outlet end of the compressor rotor 105 to circumferentially direct the compressed air in the same direction as the rotation of the rotor 105.

The combustor 103 is provided with an outer casing 110 which directly communicates with the diffuser 109 around the entire circumference to receive the compressed air from compressor 102. Thus, this embodiment does not include a separate compressor scroll or communication tube, like scroll 10 and tube 13 of the gas generating apparatus 1 of the first embodiment. Inside of the casing 110, the combustor 103 has a spiral expansion chamber tube 115 which surrounds the rotor shaft 114 interconnecting the compressor rotor 105 and a turbine rotor 120 (described later), with a combustion tube 116 disposed in an inlet end of the expansion chamber tube 115. The expansion chamber tube 115 is spirally coiled in the direction of rotation of the rotor shaft 114 while being axially displaced rearwardly (to the right as viewed in FIG. 5) to maintain the clockwise swirl of the gases.

As shown in FIG. 6, the combustion tube 116 has an open end directed downstream with respect to the expansion chamber tube 115. A fuel injection valve 117 is mounted on the head of the combustion tube 116 which is opposite to the open end thereof. The head of the combustion tube 116 has a number of through holes 119a for introducing air from the surrounding casing 110 into the combustion tube 116. The spiral expansion chamber tube 115 also has a number of holes 119b a short distance downstream of the combustion tube 116 for introducing air from the surrounding case 110. An igniter 118 is provided in the wall of the tube 115. During operation of the gas generating apparatus 100, fuel injected from the fuel injection valve 117 and air introduced into the combustion tube 116 from holes 119a are mixed into an air-fuel mixture, which is then ignited by the igniter 118 to produce a combustion gas in the expansion chamber tube 115 while additional air is introduced through the holes 119b to combine in the combustion with the gases continuing through the spiral expansion chamber tube 115.

As illustrated in FIG. 5, the turbine 104 is of an axial type comprising a turbine rotor 120 with a turbine casing 121 housing the turbine rotor 120. The turbine rotor 120 includes angularly positioned, axially extending vanes 120a. The turbine casing 121 comprises a shroud 122 accommodating the vanes of the rotor 120, a scroll 124, and exhaust tube 125. Gas exiting the scroll 124 passes the vanes 120a to drive the turbine 120 and then into an exhaust passage 125a defined between the turbine shroud 122 and the exhaust tube 125.

The rotor shaft 114 is rotatably supported in the compressor casing 106 and the turbine casing 121 by a pair of front and rear bearings 126, 127, respectively. The rotor shaft 114 is securely joined to the turbine rotor 120 behind the bearing 127. A swivel joint type flexible coupling 128 is fixedly mounted on the rotor shaft 114 between the bearings 126, 127 and the compressor rotor 105 is coupled to the coupling 128. The compressor rotor 105 and the turbine rotor 120 are thus integrally coupled to the rotor shaft 114. Thus, as with the first embodiment, the turbine rotor 120 is driven by the combusted gases and drives the compressor rotor 105 through rotor shaft 114. A transmission, a starter and other accessories are provided on the front of gas generating apparatus 100, similar to that described with respect to the first embodiment.

ADVANTAGES OF THE INVENTION

The present invention achieves many advantages over existing devices. Certain of these advantages will now be described.

According to the first feature of the present invention, a gas generating apparatus comprises a radial type compressor, a turbine having a turbine rotor coupled to a compressor rotor of the compressor through a rotor shaft, and a combustor having a spiral type expansion chamber tube surrounding the rotor shaft and communicating between the compressor and the turbine. Air or a working gas maintains a swirling flow in one direction from the compressor to the turbine. Therefore, the gas generating apparatus, is subjected to a small pressure loss, is of high efficiency, and is compact in size.

According to the second feature of the present invention, in one embodiment a scroll of the compressor is disposed in surrounding relation to a smaller-diameter portion of a shroud which covers the blades of the compressor rotor. The empty space around the shroud of the compressor is reduced, making the compressor and hence the gas generating apparatus more compact.

According to the third feature of the present invention, in one embodiment a the scroll of the turbine is disposed in surrounding relation to a smaller-diameter portion of a turbine shroud which covers the blades of the turbine rotor. The empty space around the turbine shroud of the turbine is reduced, making the turbine and the gas generating apparatus more compact.

According to the fourth feature of the present invention, in one embodiment the scroll of the compressor and the expansion chamber tube of the combustor are disposed in sandwiching relation to a diffuser of the compressor therebetween, the scroll of the compressor, the expansion chamber, and the diffuser being of substantially the same diameter, the gas generating apparatus further including a communication tube communicating between the compressor scroll and the expansion chamber tube and extending over and across the diffuser, the communication tube having a flat shape in the radial direction of the diffuser. Dead space is reduced, and the gas generating apparatus is of as nearly a compact cylindrical shape as possible. The thin or flat communication tube has a reduced outward projection while maintaining an adequate passage area therein.

According to the fifth feature of the present invention, a transmission case conceals the communication tube on its front side, thus covering an increase by the communication tube in the area of the forwardly projected shape of the gas generating apparatus.

According to the sixth feature of the present invention, in another embodiment of the gas generating apparatus the separate compressor scroll is eliminated by discharging the compressed air into a casing surrounding the spiral type expansion chamber tube thereby resulting in a compact and efficient arrangement.

Thus a gas generating apparatus for a turbine has been shown and described. Though particular embodiments and advantages have been disclosed, many modifications and advantages will be apparent to one skilled in the art from the disclosure. The invention is therefore not to be limited except in the spirit of the claims that follow.

What is claimed is:

1. A gas generating apparatus comprising:
   a compressor having a compressor rotor with radially extending rotor blades and blade-supporting hub rotating about a central axis, the rotor blades increasing in diameter from an inlet end to an outlet end of the compressor for compressing air and imparting a circumferential swirl in one direction relative to the central axis and about an outer circumference of the compressor;
   a power turbine having a turbine rotor coupled to the compressor rotor through a rotor shaft; and
   a combustor having a spiral shaped expansion chamber tube extending in said circumferential swirl direction and connected to the compressor outlet end and to an entrance of the power turbine,
   wherein the compressor, the combustor and the power turbine are arranged axially in series and coaxially along the rotor shaft with the combustor being positioned axially between the compressor and the power turbine, and with said compressor, combustor and power turbine having structural means for conducting the air and combusted gases in said circumferential swirl direction throughout the apparatus.

2. A gas generating apparatus according to claim 1 wherein the rotor shaft is supported by bearing means disposed radially inward of the combustor between the compressor rotor and the turbine rotor.

3. A gas generating apparatus according to claim 1 wherein the compressor, the expansion chamber tube and the power turbine have substantially the same outside diameter.

4. A gas generating apparatus according to claim 3 wherein the rotor shaft is supported by a bearing means disposed radially inward of the combustor between the compressor rotor and the turbine rotor.

5. A gas generating apparatus according to claim 3 wherein the combustor includes a primary nozzle.

6. A gas generating apparatus according to claim 1 wherein the compressor is a centrifugal type having a scroll and the power turbine is a radial type having a scroll.

7. A gas generating apparatus according to claim 6 wherein the scroll of the compressor is axially adjacent the outlet end of the compressor.

8. A gas generating apparatus according to claim 7 wherein the compressor includes a shroud surrounding the compressor rotor and the scroll compressor is positioned in a space surrounding the shroud.

9. A gas generating apparatus according to claim 6 wherein the scroll of the turbine is axially adjacent an inlet to the turbine.

10. A gas generating apparatus according to claim 9 wherein the turbine includes a shroud surrounding the turbine rotor and the turbine scroll is positioned in a space surrounding the shroud.

11. A gas generating apparatus according to claim 1 wherein a communication tube extends between a scroll on the compressor to the combustor for conducting air from the compressor to the combustor, and said communication tube has a relatively thin and flat shape in the radial direction and extends circumferentially.

12. A gas generating apparatus according to claim 11 further including a transmission case positioned in front of the compressor and concealing a front side of the communication tube.

13. A gas generating apparatus according to claim 1 wherein the compressor includes an axial type compressor portion connected in series to and upstream of said compressor rotor wherein air exiting the axial type compressor portion enters the compressor rotor.

14. A gas generating apparatus comprising:
a compressor having a compressor rotor with radially extending rotor blades and blade-supporting hub rotating about a central axis, the compressor rotor increasing in diameter from an inlet end to an outlet end of the compressor for compressing air and imparting a circumferential swirl in one direction relative to the central axis and about an outer circumference of the compressor;

a power turbine having a turbine rotor coupled to the compressor rotor through a rotor shaft; and
a combustor having a spiral shaped expansion chamber tube extending in said circumferential swirl direction and connected to the compressor outlet end and to an entrance of the power turbine,
wherein the compressor, the combustor and the power turbine ar axially arranged in series and coaxially along the rotor shaft with the combustor being positioned axially between the compressor and the power turbine, and with said compressor, combustor and power turbine having structural means for conducting the air and combusted gases in said circumferential swirl direction throughout the apparatus, and
wherein the combustor includes a casing surrounding the spiral shaped expansion chamber tube, said casing being directly connected to said compressor for receiving compressed air directly from the outlet end of the compressor.

15. A gas generating apparatus according to claim 14 wherein the compressor, the casing and the power turbine have substantially the same outside diameter.

* * * * *